(12) United States Patent
Kirby

(10) Patent No.: US 9,940,657 B2
(45) Date of Patent: Apr. 10, 2018

(54) DYNAMICALLY CREATED NETWORK SITES

(71) Applicant: Amazon Technologies, Inc., Reno, NV (US)

(72) Inventor: Christopher Paul Kirby, Lake Tapps, WA (US)

(73) Assignee: Amazon Technologies, Inc., Seattle, WA (US)

( * ) Notice: Subject to any disclaimer, the term of this patent is extended or adjusted under 35 U.S.C. 154(b) by 921 days.

(21) Appl. No.: 14/283,805

(22) Filed: May 21, 2014

(65) Prior Publication Data
US 2014/0258040 A1 Sep. 11, 2014

Related U.S. Application Data

(63) Continuation of application No. 12/911,505, filed on Oct. 25, 2010, now Pat. No. 8,738,466.

(51) Int. Cl.
*G06Q 30/00* (2012.01)
*G06Q 30/06* (2012.01)
*G06F 17/30* (2006.01)

(52) U.S. Cl.
CPC ... *G06Q 30/0625* (2013.01); *G06F 17/30864* (2013.01); *G06Q 30/0601* (2013.01)

(58) Field of Classification Search
CPC .................................................. G06Q 30/0625
USPC ............................ 705/26.62, 27.2, 26.8, 708
See application file for complete search history.

(56) References Cited

U.S. PATENT DOCUMENTS

| | | | |
|---|---|---|---|
| 6,701,343 B1 * | 3/2004 | Kenyon | G06F 17/3089 707/E17.116 |
| 7,606,740 B2 * | 10/2009 | Greaves | G06Q 30/02 705/26.5 |
| 2001/0039543 A1 | 11/2001 | Mann et al. | |
| 2004/0098375 A1 | 5/2004 | DeCarlo, III | |
| 2004/0199520 A1 * | 10/2004 | Ruiz | H04L 29/12594 |
| 2004/0230446 A1 | 12/2004 | Park et al. | |
| 2005/0234921 A1 | 10/2005 | King et al. | |
| 2005/0278644 A1 * | 12/2005 | Greaves | G06Q 30/02 715/760 |
| 2007/0174117 A1 | 7/2007 | Hendrickson et al. | |
| 2007/0245348 A1 * | 10/2007 | Araujo, Jr. | G06F 21/53 718/1 |
| 2008/0307049 A1 | 12/2008 | Curran et al. | |
| 2008/0319950 A1 * | 12/2008 | Lasa | G06F 17/30899 |

(Continued)

OTHER PUBLICATIONS

"Homestead Technologies Unveils New Web-Site Building Service Designed for Small Businesses, Organizations and Professionals," PR Newswire, Apr. 9, 2001, Dialog file 613 #00547787, 4pgs.

(Continued)

*Primary Examiner* — Robert M Pond
(74) *Attorney, Agent, or Firm* — Thomas|Horstemeyer, LLP

(57) ABSTRACT

Disclosed are various embodiments for dynamically generating a network site for a topic. A set of search terms that are associated with one or more search engines are obtained. A respective set of items in an item catalog that are relevant for each of the search terms are identified. A respective network site is established for each of the search terms when the respective set of items includes at least a predefined number of items. The respective network site offers at least some of the respective items for sale.

20 Claims, 7 Drawing Sheets

(56) References Cited

U.S. PATENT DOCUMENTS

2009/0299920 A1* 12/2009 Ferris ................... G06Q 10/06
  705/418
2009/0327275 A1* 12/2009 Walker .............. G06F 17/30893
2010/0306351 A1  12/2010 Lee et al.
2011/0112897 A1*  5/2011 Tietzen ................ G06Q 30/02
  705/14.25

OTHER PUBLICATIONS

"Register.com Teams Up with Intuit to Offer Domain Name Services," Business Wire, Sep. 20, 1999, Dialog file 610 #001 05958, 2pgs.

"Leading ISP Automates Web Hosting Services," PC Week Oct. 7, 1996, Dialog file 16 #0461 0189, 1 pg.

"Name your Domain," Sarah Stambler's Marketing and Technology News, v9n11 p. 71, Dialog file 636 #05356885, 1 pg.

* cited by examiner

DYNAMICALLY CREATED NETWORK SITES

CROSS-REFERENCE TO RELATED APPLICATION

This application is a continuation of, and claims priority to, co-pending U.S. patent application entitled "DYNAMICALLY CREATED NETWORK SITES," filed on Oct. 25, 2010, and assigned application Ser. No. 12/911,505, which is incorporated herein by reference in its entirety.

BACKGROUND

A meta-shopping site is a network site that allows customers to browse item offerings from a variety of online merchants. Customers may then decide to purchase items based, for example, on price comparisons, shipping costs, item availability, item selection, and/or other factors. Typically, merchants supply a data feed representing their online catalog to the meta-shopping site. When a customer seeks more information about an item or wants to purchase the item, the customer may be redirected to a network site of the respective merchant.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to dynamically generating network sites that are customized for particular topics. In one embodiment, such topics may be obtained from lists of popular search terms that are published by search engines. An item catalog may be searched for items that are relevant to a topic. If a sufficient number of relevant items are found, a dynamically managed network site may be established. The network site may offer the relevant items for sale. In some embodiments, relevant external item offerings from external network sites may be determined and also featured in the network site. In various embodiments, the computing resources that are allocated to the network site may be managed automatically. In the following discussion, a general description of the system and its components is provided, followed by a discussion of the operation of the same.

Figure 1:
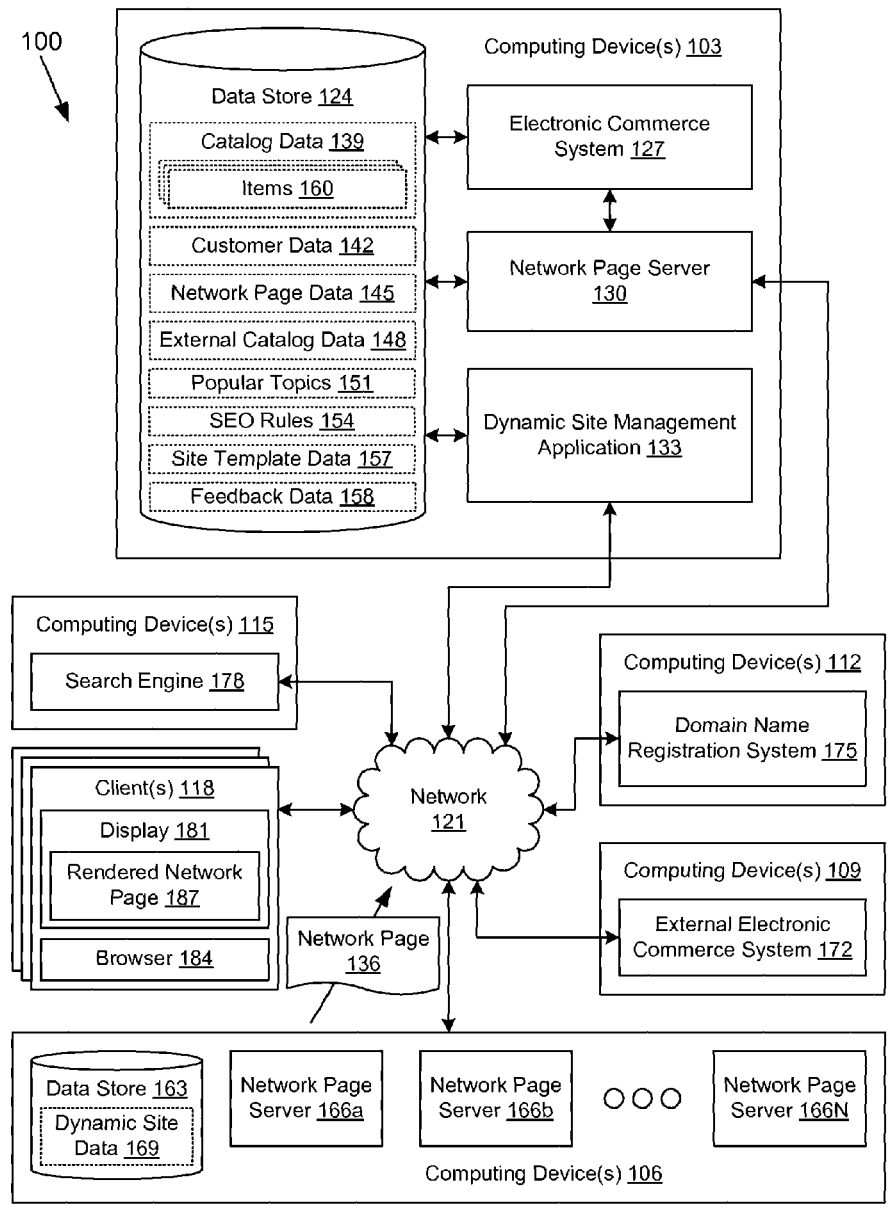
FIG. 1 is a drawing of a networked environment according to various embodiments of the present disclosure.

With reference to FIG. 1, shown is a networked environment 100 according to various embodiments. The networked environment 100 includes one or more computing devices 103, one or more computing devices 106, one or more computing devices 109, one or more computing devices 112, one or more computing devices 115, and one or more clients 118 that are in data communication by way of a network 121. The network 121 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 124 that is accessible to the computing device 103. The data store 124 may be representative of a plurality of data stores 124 as can be appreciated. The data stored in the data store 124, for example, is associated with the operation of the various applications and/or functional entities described below.

The components executed on the computing device 103, for example, include an electronic commerce system 127, a network page server 130, a dynamic site management application 133, and other applications, services, processes, systems, engines, or functionality not discussed in detail herein. The electronic commerce system 127 is executed in order to facilitate the online purchase of items over the network 121. The electronic commerce system 127 also performs various backend functions associated with the online presence of one or more merchants in order to facilitate the online purchase of items. For example, the electronic commerce system 127 generates network pages 136 such as web pages or other types of network content that are provided to clients 118 for the purposes of selecting items for purchase, rental, download, lease, or other forms of consumption. The electronic commerce system 127 may also facilitate a keyword-based search of an item catalog.

The network page server 130 is executed to serve up network pages 136 generated by the electronic commerce system 127 or other forms of network content to the client 118 over the network 121. In various embodiments, the network page server 130 may comprise a commercially available hypertext transfer protocol (HTTP) server application such as, for example, Apache® HTTP Server, Apache® Tomcat®, Microsoft® Internet Information Services (IIS), etc.

The dynamic site management application 133 is executed to obtain topics and establish dynamic network sites that are relevant to the topics. The dynamic network sites may be search engine optimized for each topic. A dynamic network site may offer items for sale that are relevant to the respective topic. Further, in some embodiments, a dynamic network site may include item offerings collected from external network sites. The dynamic site management application 133 may be configured to scale up or scale down the computing resources allocated to the network site automatically as desired.

The data stored in the data store 124 includes, for example, catalog data 139, customer data 142, network page data 145, external catalog data 148, popular topics 151, search engine optimization (SEO) rules 154, site template data 157, feedback data 158, and potentially other data. The catalog data 139 includes data regarding a plurality of items 160 that are offered to customers through an electronic marketplace of one or more merchants. An item 160 may correspond to any good, product, service, software item, multimedia item, or other item that may be offered for sale, purchase, download, lease, or any other form of consumption as can be appreciated. Each item 160 may include various data such as, for example, title, description, price, weight, customer reviews, categories, quantities, conditions, options, and/or other data.

The customer data 142 includes various data relating to a profile of a customer. Such data may include, for example, contact information, address information, order history, page view history, click trails, etc. Such data may be useful, for example, in marketing items 160 to the customer that are related to other items 160 that the customer has ordered or viewed in the past. The network page data 145 includes various data used in generating network pages 136, such as, for example, code, text, style sheets, graphics, images, audio, video, and so on.

The external catalog data 148 includes data regarding offerings of items 160 by external merchants. Such offerings may be aggregated by the dynamic site management application 133 or another application by accessing one or more externally hosted network sites associated with the third-party merchants. The external catalog data 148 may include uniform resource locators (URLs) of network pages on the external network sites such as, for example, detail network pages with more information about the item 160, network pages that facilitate ordering of the item 160, and so on. In one embodiment, the external catalog data 148 may also be obtained from data feeds provided by the external merchants.

The popular topics 151 correspond to topics that are currently significant to online users. To this end, the popular topics 151 may correspond to search terms that are currently the most popular, or search terms that are frequently searched beyond a threshold. Lists of such search terms may be published by the search engines. Each of the popular topics 151 may include one or more keywords and/or other punctuation for search terms that are significant to a search engine, such as, for example, Boolean connectors. In one embodiment, the popular topics 151 may be manually specified by a user.

The SEO rules 154 are rules employed to optimize network sites and network content for favorable indexing and ranking by search engines. To this end, the SEO rules 154 may describe approaches to forming domain names based at least in part on a search term or another term that is to be optimized. As a non-limiting example, an SEO rule 154 may specify that adding the top-level domain ".com" to a search term is the most preferred domain name for SEO. Further, adding the top-level domain ".net" to a search term may be the next most preferred domain name for SEO. If those domain names are unavailable, adding "online.com" to a search term may be the next most preferred domain name for SEO. It is understood that many similar examples may be used as needed to accomplish domain name optimization for search engines.

Additionally, the SEO rules 154 may describe how to form a network page based at least in part on a search term or other term in such a way that the network page is likely to receive favorable indexing and ranking from search engines. Such SEO rules 154 may govern, for example, keyword repetition in content, keyword insertion in "meta" tags, keyword insertion in titles, keyword insertion in alternate image text, keyword insertion in links and headings, keyword insertion in URLs, and so on. As another non-limiting example, SEO rules 154 may also direct that links to a first network site be inserted in network pages of a second network site in order to increase the search engine ranking of the first network site.

The site template data 157 includes code and other data used in generating dynamic network pages 136 from a dynamic network site managed by the dynamic site management application 133. In various embodiments, the site template data 157 may include Perl code, PHP code, Ruby on Rails code, ColdFusion code, FreeMarker code, Java Server Pages, Active Server Pages, and/or other code that may be used to generate network pages 136 dynamically. In one embodiment, a site template in the site template data 157 may be configured to generate network pages 136 for a network site according to the domain name of the site as obtained from an HTTP request or other network page request.

The feedback data 158 includes any information obtained from the dynamic network sites that may be used to improve marketing, merchandising, or other features of the electronic commerce system 127. As a non-limiting example, it may be determined that a customer purchases an item from an external network site. The purchase price and/or other information may be stored in the feedback data 158. The electronic commerce system 127 may use the feedback data 158, for example, to adjust pricing or presentation of items 160 in an online catalog, better tailor recommendations of items 160 to users, and/or perform other functions.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

Where the computing device 106 comprises a cloud computing resource, the computing device 106 may also comprise an elastic computing resource. The computing device 106 may include a multitude of virtual machine instances. In various embodiments, a user may be able to launch new virtual machine instances and/or stop existing virtual machine instances as desired. Such an elastic computing resource facilitates scaling computing resources up or down as needed for applications.

Various applications and/or other functionality may be executed in the computing device 106 according to various embodiments. Also, various data is stored in a data store 163 that is accessible to the computing device 106. The data store 163 may be representative of a plurality of data stores 124 as can be appreciated. The data stored in the data store 163, for example, is associated with the operation of the various applications and/or functional entities described below.

The components executed on the computing device 106, for example, include a plurality of network page servers 166a, 166b . . . 166N and other applications, services, processes, systems, engines, or functionality not discussed in detail herein. Each network page server 166 is executed to serve up network pages 136 of dynamic network sites. In various embodiments, each network page server 166 may comprise a commercially available hypertext transfer protocol (HTTP) server application such as, for example, Apache® HTTP Server, Apache® Tomcat®, Microsoft® Internet Information Services (IIS), etc. In one embodiment, each network page server 166 may host one dynamic network site. Further, multiple network page servers 166 may host the same dynamic network site as needed to meet demand. In another embodiment, one network page server 166 may host multiple dynamic network sites by way of virtual hosting. In one embodiment, each network page server 166 may be executed in a different computing device 106 or a different virtual machine instance of the computing device 106.

The data stored in the data store 163 includes, for example, dynamic site data 169 and potentially other data. The dynamic site data 169 may include configuration settings and templates associated with the dynamic network sites hosted through the computing device 106. In one embodiment, the dynamic site data 169 comprises virtual machine images that include the network page servers 166 and their respective configurations.

The computing devices 109, 112, and 115 may comprise, for example, server computers or any other systems providing computing capability. Alternatively, a plurality of computing devices 109, 112, and 115 may be employed that are arranged, for example, in one or more server banks or computer banks or other arrangements. For example, a plurality of computing devices 109, 112, and 115 together may comprise a cloud computing resource, a grid computing resource, and/or any other distributed computing arrangement. Such computing devices 109, 112, and 115 may be located in a single installation or may be distributed among many different geographical locations. In one embodiment, each of the computing devices 109, 112, and 115 is operated by a different entity relative to the computing device 103 and the electronic marketplace hosted thereon. For purposes of convenience, each computing device 109, 112, and 115 is referred to herein in the singular. Even though each computing device 109, 112, and 115 is referred to in the singular, it is understood that a plurality of computing devices 109, 112, and 115 may be employed in the various arrangements as described above.

Various applications and/or other functionality may be executed in each computing device 109, 112, and 115 according to various embodiments. Also, various data may be stored in one or more data stores that are accessible to the respective computing device 109, 112, and 115. The components executed on the computing device 109, for example, include an external electronic commerce system 172 and other applications, services, processes, systems, engines, or functionality not discussed in detail herein. The components executed on the computing device 112, for example, include a domain name registration system 175 and other applications, services, processes, systems, engines, or functionality not discussed in detail herein. The components executed on the computing device 115, for example, include a search engine 178 and other applications, services, processes, systems, engines, or functionality not discussed in detail herein.

The external electronic commerce system 172 is executed in order to facilitate the online purchase of items 160 over the network 121. The external electronic commerce system 172 also performs various backend functions associated with the online presence of one or more merchants in order to facilitate the online purchase of items 160. For example, the external electronic commerce system 172 generates network pages 136 such as web pages or other types of network content that are provided to clients 118 for the purposes of selecting items for purchase, rental, download, lease, or other forms of consumption. The external electronic commerce system 172 may also facilitate a keyword-based search of an item catalog. In contrast with the electronic commerce system 127, the external electronic commerce system 172 may be operated by a different entity and may use different software. Although the dynamic site management application 133 may have full access to the catalog data 139 and other data on the back end of the electronic commerce system 127, the dynamic site management application 133 may have only limited access to the external electronic commerce system 172, similar to the access granted to any public client 118.

The domain name registration system 175 is executed to facilitate the registration of domain names in the domain name system through a domain registrar. A particular domain name registration system 175 may be capable of registering domain names under one or multiple top-level domain names. As a non-limiting example, one domain name registration system 175 may be used for registering domain names under ".info," while another domain name registration system 175 may be used for registering domain names under ".biz." The domain name registration system 175 may also be capable of receiving an electronic payment for the domain name registration. Additionally, the domain name registration system 175 may provide a "whois" search interface to determine the registration status of a domain name; i.e., whether the domain name is available or unavailable. The domain name registration system 175 may be configured with manual and/or automatic registration interfaces in various embodiments.

The search engine 178 corresponds to any network site or application that provides a search function. The search engine 178 may correspond to an online application that crawls and indexes network sites, such as, for example, Google®, Bing®, and others. The search engine 178 may also correspond to an online application that facilitates searches of a social network, product catalog, or other types of databases. Non-limiting examples of such search engines 178 may include Facebook®, Twitter®, etc. In one embodiment, the search engine 178 obtains a query and provides a ranked list of network pages or other items from an index that match the query or are otherwise relevant to the query. In one embodiment, the search engine 178 may make lists of popular search terms available that correspond to queries that have been frequently processed by the search engine 178 within a defined time frame. The ranking approaches used by the search engine 178 may be proprietary and unknown to the entity that controls the dynamic site management application 133. Accordingly, the SEO rules 154 may represent merely approximations as how best to craft a dynamic network site to rank relatively well according to the logic employed by a particular search engine 178.

The client 118 is representative of a plurality of client devices that may be coupled to the network 121. The client 118 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 118 may include a display 181. The display 181 may comprise, for example, one or more devices such as cathode ray tubes (CRTs), liquid crystal display (LCD) screens, gas plasma-based flat panel displays, LCD projectors, or other types of display devices, etc.

The client 118 may be configured to execute various applications such as a browser 184 and/or other applications. The browser 184 may be executed in a client 118, for example, to access and render network pages 136, such as web pages, or other network content served up by the computing device 103, 106, 109, 115 and/or other servers, thereby generating a rendered network page 187 on the display 181. The client 118 may be configured to execute applications beyond browser 184 such as, for example, email applications, instant message applications, and/or other applications.

Next, a general description of the operation of the various components of the networked environment 100 is provided. To begin, the dynamic site management application 133 is manually or automatically configured to establish one or more dynamic network sites upon receipt of the popular topics 151 from a user, from a search engine 178, or from another network site that provides lists of popular topics 151. The dynamic site management application 133 searches a catalog of items 160 associated with an electronic marketplace using the electronic commerce system 127. If a sufficient number of items 160 are relevant to a popular topic 151, a dynamic network site is established.

The dynamic site management application 133 registers an optimized domain name for the site with the domain name registration system 175. Multiple domain names may be generated according to a search engine optimization preference, and the most preferred domain name may not be available. If a most preferred domain name is unavailable, a next most preferred domain name may be registered, and so on. In one embodiment, multiple domain names may be registered for a given popular topic 151.

Items 160 offered for sale by external electronic commerce systems 172 may be determined, and the external catalog data 148 may be populated. Items 160 that are relevant to the popular topic 151 that are offered by external merchants may be determined and included within the dynamic network site, if desired. A site template from the site template data 157 may be located and used in establishing the dynamic network site. Configuration settings may be stored in the dynamic site data 169. The dynamic network site is generated with a goal of being optimized for indexing and ranking within one or more search engines 178 for the given popular topic 151.

One or more network page servers 166 may be configured by the dynamic site management application 133 to serve up network pages 136 of the dynamic network site. In various embodiments, the computing resources in the computing device 106 that are assigned for serving up the dynamic network site may be scaled up or scaled down as appropriate based on page requests and/or other metrics of resource usage.

Ultimately, a customer at a client 118 may discover the dynamic network site through a search in the search engine 178. Upon a request being sent to the appropriate network page server 166, a network page 136 may be generated by the network page server 166 according to the dynamic site data 169. The network page 136 may offer various items 160 for sale that relate to the given popular topic 151. The network page 136 may include links to other network pages 136 served up by the network page server 130 to initiate and complete orders for items 160 through the electronic commerce system 127.

The network page 136 generated by the network page server 166 may also include item offerings from external merchants. Thus, the dynamic network site may correspond to a "meta-shopping" site, where the offerings of multiple unrelated merchants may be compared by customers. When a customer expresses an interest in such item offerings, the interest may be associated with customer data 142 and recorded in the feedback data 158 for future use in marketing, merchandising, etc.

In one example, it may be inferred that a customer has purchased an item 160 from an external merchant when a customer views an item 160 on the network site of the external merchant and does not return to the dynamic network site. In another example, it may be inferred that a customer has purchased an item 160 from an external merchant when a customer clicks a buy link for the item 160 as presented in the dynamic network site and does not return to the dynamic network site. In yet another example, the external merchant may be a partner, subsidiary, or other affiliate of the operator of the electronic commerce system 127. In such a case, the external electronic commerce system 172 may provide direct feedback as to whether a customer referred by the dynamic network site has purchased an item 160.

Such feedback regarding the external purchases and/or external page views of customers may be stored in the feedback data 158 and used for improving various aspects of the electronic commerce system 127. Such feedback data 158 may be manually or automatically analyzed to determine why the customers did not purchase items 160 through the electronic commerce system 127. Accordingly, prices, presentations, and selections of items 160 may be adjusted by the electronic commerce system 127 to be more competitive with the external electronic commerce systems 172. In one embodiment, the feedback data 158, or the results of analyzing the feedback data 158, may be published for the use of other companies.

Figure 2:
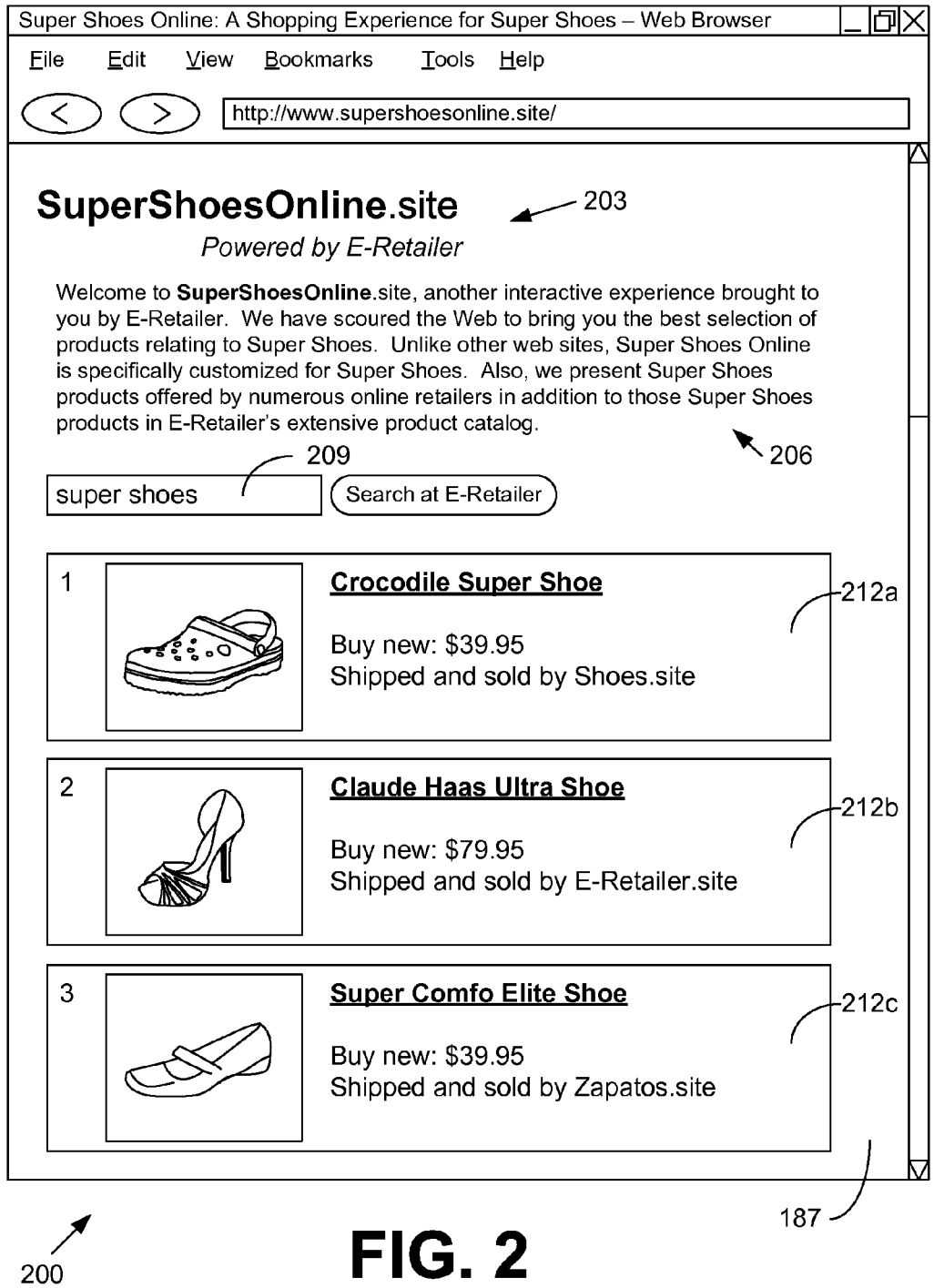
FIG. 2 is a drawing of an example of a user interface rendered by a client in the networked environment of FIG. 1 according to various embodiments of the present disclosure.

Moving on to FIG. 2, shown is an example user interface 200 rendered in a browser 184 (FIG. 1) executed in a client 118 (FIG. 1) in the networked environment 100 (FIG. 1). In particular, FIG. 2 depicts a rendered network page 187 that has been served up by a network page server 166 (FIG. 1). The rendered network page 187 corresponds to a home page of a dynamic network site created for a particular popular topic 151 (FIG. 1) identified by the dynamic site management application 133 (FIG. 1). The topic used in FIG. 2 is "super shoes."

The heading 203 for the rendered network page 187 identifies the dynamic network site as being accessible through the domain name "supershoesonline.site." Such a domain name may be generated by the dynamic site management application 133 according to the topic of "super shoes" and an SEO rule 154 (FIG. 1) for forming a domain name, for example, by concatenating words of the topic with "online.site." The heading 203 also identifies the dynamic network site as being affiliated with "E-Retailer," which may correspond, for example, to the proprietor of the electronic marketplace serviced by the electronic commerce system 127 (FIG. 1).

The rendered network page 187 includes content 206 that is search engine optimized for the topic of "super shoes." To this end, the content 206 includes various repetitions of "super shoes." In one embodiment, the content 206 may comprise a template where the topic is to be inserted at various predefined locations.

The rendered network page 187 may also include a search tool 209. The search tool 209, which in this non-limiting example, comprises a text entry box and a submit button, may instead comprise other types of user interface components as can be appreciated. In this case, the search tool 209 is pre-populated with the topic, which indicates that a search for items 160 (FIG. 1) in the catalog data 139 (FIG. 1) of the electronic marketplace that match the topic may be carried out if desired.

A plurality of related item results 212a, 212b, and 212c are included in the rendered network page 187. It is understood that any number of related item results 212 may be included in the rendered network page 187 depending, for example, on the relevant items 160 in the catalog, the screen space available in the rendered network page 187, and/or other factors. Each of the related item results 212 corresponds to an item 160 that is deemed by the dynamic site management application 133 or another application to be relevant to the topic.

The related item result 212a corresponds to an item 160 titled "Crocodile Super Shoe," which is offered for sale by a third-party external merchant of "Shoes.site." The dynamic site management application 133 may have considered the item 160 particularly relevant because the title contains the topic keywords. The related item result 212a may include one or more links to an external network site operated by the external merchant. Such links may point to detailed network pages 136 regarding the item, network pages 136 that facilitate ordering the item 160 from the external merchant, and so on. Because the item 160 is offered by the external electronic commerce system 172 (FIG. 1), the dynamic site management application 133 may have only limited information about the item 160, i.e., data that corresponds to the item offering through the external electronic commerce system 172.

The related item result 212b corresponds to an item 160 titled "Claude Haas Ultra Shoe," which is offered for sale through the electronic commerce system 127 by the proprietor of the electronic marketplace. In various embodiments, the related item result 212b may include additional information about the item 160 relative to external offerings because the dynamic site management application 133 has access to the underlying catalog data 139. Although the title in the related item result 212b does not include an exact match for the topic keywords, the related item result 212b may still rank relatively well in order to promote items 160 that are offered for sale by the proprietor of the electronic marketplace.

The related item result 212c corresponds to another external offering from a different external merchant, "Zapatos.site." The title of the item 160 is "Super Comfo Elite Shoe," which includes the topic keywords but splits them. Accordingly, the related item result 212c may not rank as well as an exact match. It is understood that the dynamic site management application 133 may employ various other factors in ranking the related item results 212, such as, for example, number of sales, number of views, profit, sales price, merchant affiliation status with the electronic marketplace, etc.

It is noted that although the related item results 212 are from different sources, which are internal or external, the related item results 212 may have the same prominence in the listing of related item results 212. In other words, in various embodiments, items 160 sold through the electronic marketplace may be featured with the same prominence in the rendered network page 187 as the external item offerings.

Figure 3:
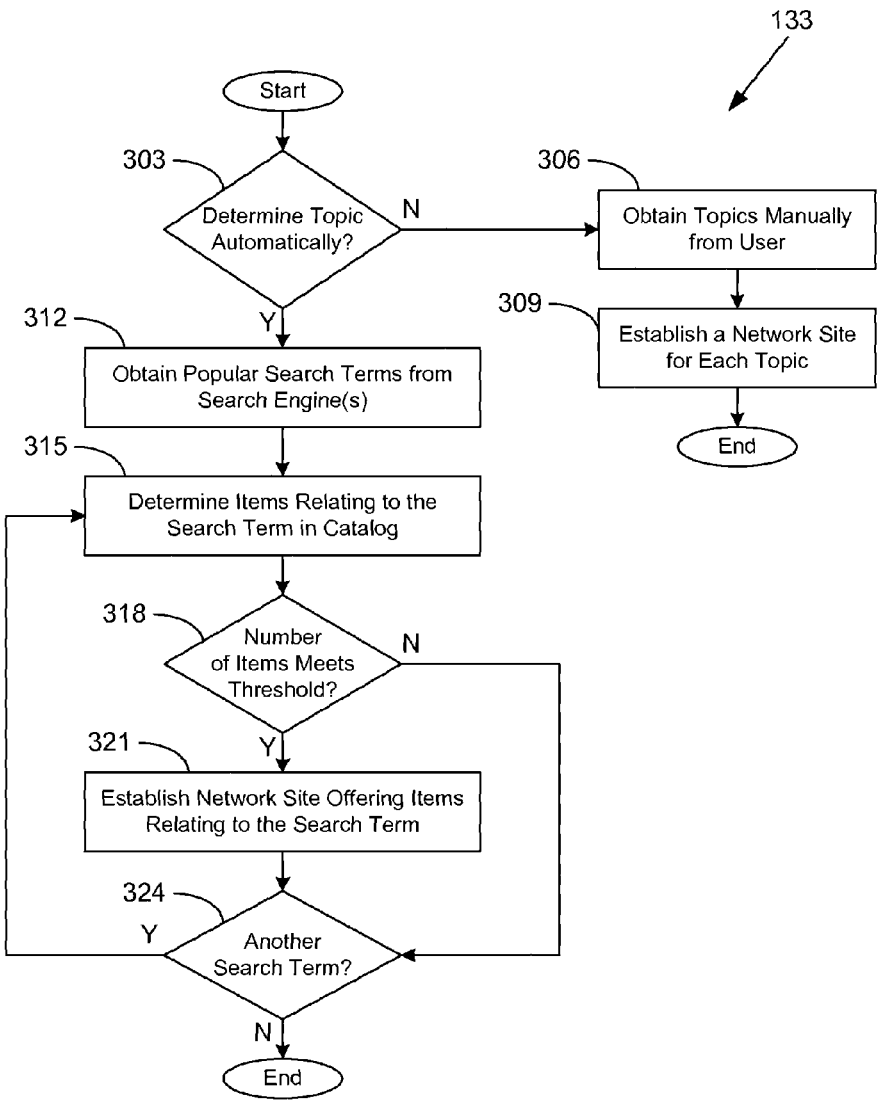
FIGS. 3-5 are flowcharts illustrating examples of functionality implemented as portions of a dynamic site management application executed in a computing device in the networked environment of FIG. 1 according to various embodiments of the present disclosure.

Referring next to FIG. 3, shown is a flowchart that provides one example of the operation of a portion of the dynamic site management application 133 according to various embodiments. Specifically, the portion of the dynamic site management application 133 depicted in FIG. 3 relates to the establishment of network sites for search terms and/or other topics. It is understood that the flowchart of FIG. 3 provides merely an example of the many different types of functional arrangements that may be employed to implement the operation of the portion of the dynamic site management application 133 as described herein. As an alternative, the flowchart of FIG. 3 may be viewed as depicting an example method implemented in the computing device 103 (FIG. 1) according to one or more embodiments.

Beginning with box 303, the dynamic site management application 133 decides whether a topic is to be determined automatically. If the topic is not to be determined automatically, the dynamic site management application 133 moves to box 306 and obtains one or more topics manually from a user at a client 118 (FIG. 1). Next, in box 309, the dynamic site management application 133 establishes a network site for each topic. The establishment of a network site will be discussed in further detail with respect to the flowchart of FIG. 4. Thereafter, the portion of the dynamic site management application 133 ends.

If a topic is to be determined automatically, the dynamic site management application 133 instead moves to box 312 and obtains popular search terms from one or more search engines 178 (FIG. 1). Such popular search terms may be stored in the popular topics 151. Alternatively, or additionally, the popular topics 151 may be pushed to the data store 124 (FIG. 1) by way of a data feed.

In box 315, the dynamic site management application 133 determines which items 160 (FIG. 1) relate to one of the search terms from the catalog data 139 (FIG. 1). Such items 160 may be offered for sale by the electronic commerce system 127 (FIG. 1) through an electronic marketplace. In one embodiment, the dynamic site management application 133 may search the catalog data 139 using an internal search engine to find items 160 that are relevant to the search term. In one embodiment, the dynamic site management application 133 may be under the control of the proprietor of the electronic marketplace or another merchant. In box 318, the dynamic site management application 133 determines whether the number of relevant items 160 meets a threshold.

If the number of relevant items 160 meets a threshold, the dynamic site management application 133 moves to box 321 and establishes a dynamic network site that offers items 160 that relate to the search term. The establishment of a network site will be discussed in further detail with respect to the flowchart of FIG. 4. The dynamic site management application 133 next moves to box 324. If the dynamic site management application 133 determines in box 318 that the number of relevant items 160 does not meet the threshold, the dynamic site management application 133 also moves to box 324.

In box 324, the dynamic site management application 133 determines whether another search term or topic remains to be processed. If another search term or topic remains to be processed, the dynamic site management application 133 returns to box 315 and determines the items 160 relating to the next search term or topic that are in the item catalog. Otherwise, the portion of the dynamic site management application 133 ends.

Figure 4:
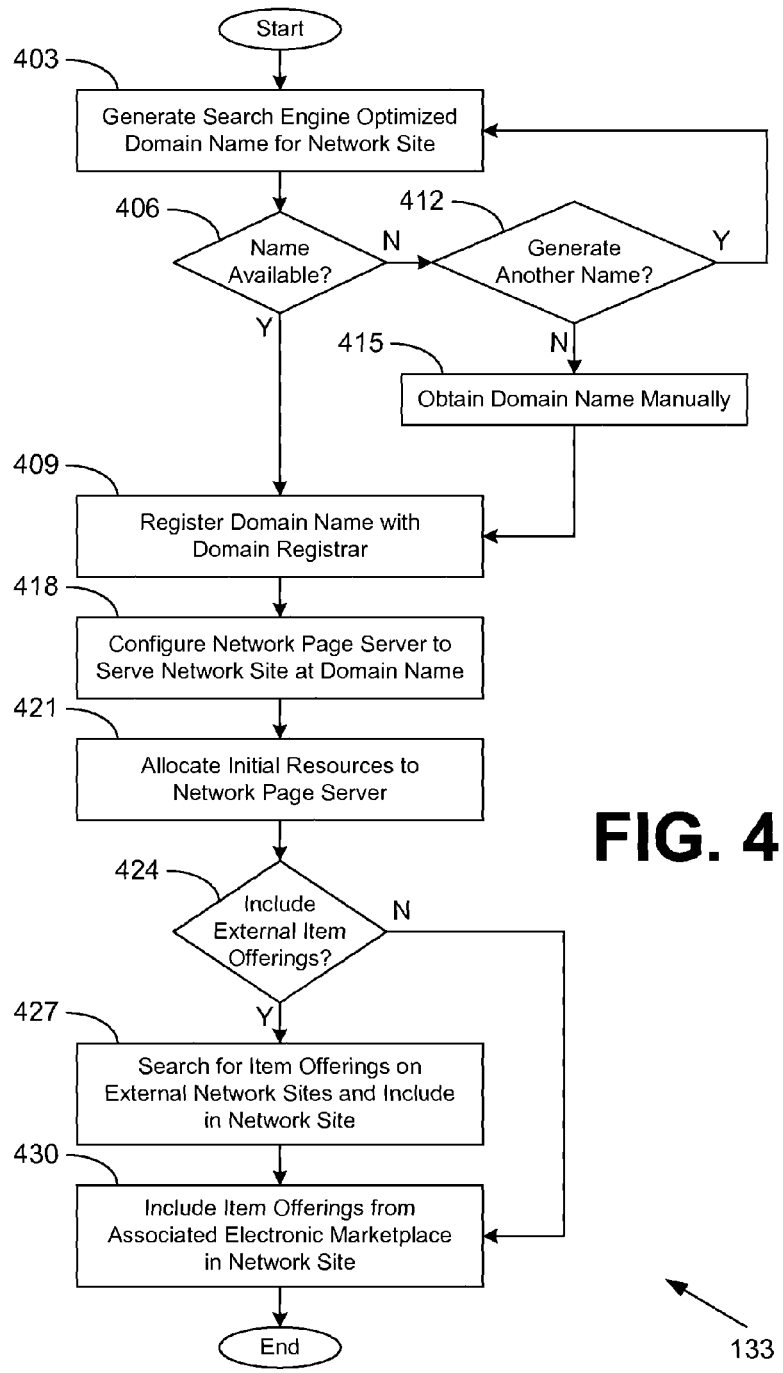

Turning now to FIG. 4, shown is a flowchart that provides one example of the operation of another portion of the dynamic site management application 133 according to various embodiments. Specifically, the portion of the dynamic site management application 133 depicted in FIG. 4 relates to an establishment of a dynamic network site in the computing device 106 (FIG. 1). It is understood that the flowchart of FIG. 4 provides merely an example of the many different types of functional arrangements that may be employed to implement the operation of the portion of the dynamic site management application 133 as described herein. As an alternative, the flowchart of FIG. 4 may be viewed as depicting an example method implemented in the computing device 103 (FIG. 1) according to one or more embodiments.

Beginning with box 403, the dynamic site management application 133 generates at least one search engine optimized domain name for a network site given a particular set of keywords relating to a topic. The dynamic site management application 133 may employ one or more SEO rules 154 (FIG. 1) in order to generate such a domain name. In box 406, the dynamic site management application 133 determines whether the generated domain name is available. To this end, the dynamic site management application 133 may perform a "whois" lookup through the domain name registration system 175 (FIG. 1). If the generated domain name is available, the dynamic site management application 133 proceeds to box 409.

If the generated domain name is unavailable (for instance, if it is previously registered), the dynamic site management application 133 continues to box 412 and decides whether to generate another domain name. If another domain name is to be generated, the dynamic site management application 133 returns to box 403 and generates another domain name. If another domain name is not to be generated, the dynamic site management application 133 moves to box 415 and obtains a domain name manually. As a non-limiting example, a notification may be sent to a user at a client 118 (FIG. 1) requesting that the user provide a domain name for the topic. In one embodiment, the user may provide the domain name through a network page-based interface served up by the dynamic site management application 133. Once the domain name is obtained manually, the dynamic site management application 133 also proceeds to box 409.

In box 409, the dynamic site management application 133 registers the domain name with a domain name registration system 175 corresponding to an appropriate domain registrar for the domain name to be registered. In box 418, the dynamic site management application 133 configures one or more network page servers 166 (FIG. 1) executed in the computing device 106 to serve up a dynamic network site at the domain name. In one embodiment, the dynamic site management application 133 may update domain name system (DNS) entries in a DNS server to point to network addresses of the network page servers 166 that are to serve up the dynamic network site. In box 421, the dynamic site management application 133 allocates an initial quantity of resources on the computing device 106 to the network page server(s) 166. For example, where the computing device 106 comprises an elastic computing resource, the dynamic site management application 133 may allocate an initial number of virtual machine instances for the network page servers 166.

Next in box 424, the dynamic site management application 133 determines whether external item offerings are to be included in the dynamic network site. It may be beneficial for the operator of the dynamic network site to include item offerings of external merchant competitors in order to obtain additional information about customers. The additional information, such as whether a customer visits an external network site or purchases an item 160 (FIG. 1) from a competitor, may be associated with a profile of the customer in the customer data 142 (FIG. 1) and used by the operator of the dynamic network site for marketing and/or other purposes.

If external item offerings are to be included, the dynamic site management application 133 continues to box 427 and searches for relevant item offerings on external network sites through one or more external electronic commerce systems 172. The relevant item offerings may then be stored in the external catalog data 148 and included in the dynamic network site. The dynamic site management application 133 then continues to box 430. If the dynamic site management application 133 determines in box 424 that external item offerings are to be excluded, the dynamic site management application 133 also continues to box 430.

In box 430, the dynamic site management application 133 includes relevant item offerings from an associated electronic marketplace in the network site. To this end, the dynamic site management application 133 may use the electronic commerce system 127 (FIG. 1) to search for various items 160 that are relevant to the topic of the dynamic network site. Thereafter, the portion of the dynamic site management application 133 ends.

Figure 5:
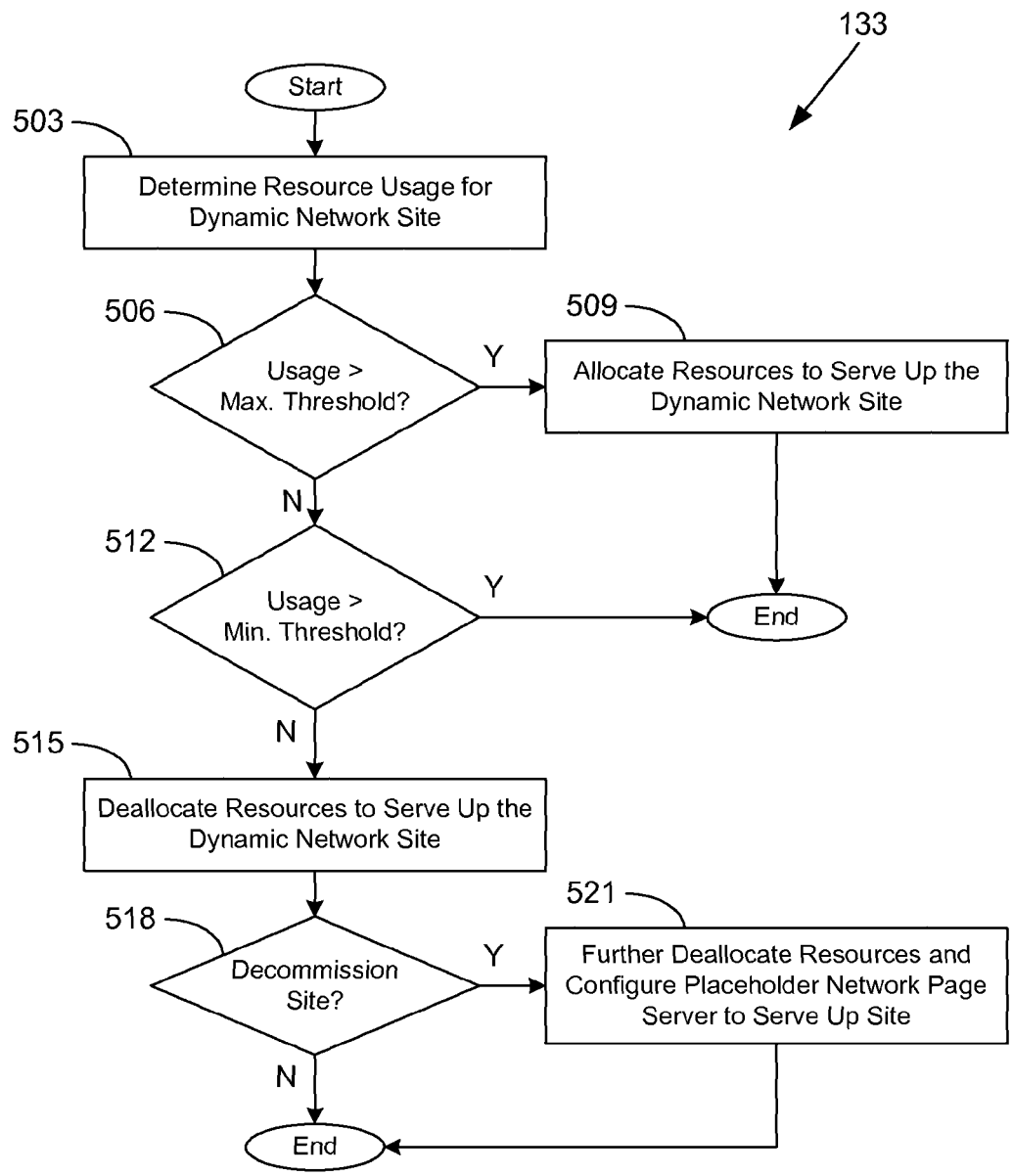

Looking next to FIG. 5, shown is a flowchart that provides one example of the operation of yet another portion of the dynamic site management application 133 according to various embodiments. Specifically, the portion of the dynamic site management application 133 depicted in FIG. 5 relates to scaling the computing resources associated with a dynamic network site. It is understood that the flowchart of FIG. 5 provides merely an example of the many different types of functional arrangements that may be employed to implement the operation of the portion of the dynamic site management application 133 as described herein. As an alternative, the flowchart of FIG. 5 may be viewed as depicting an example method implemented in the computing device 103 (FIG. 1) according to one or more embodiments.

Beginning with box 503, the dynamic site management application 133 determines the resource usage associated with a dynamic network site. As a non-limiting example, the resource usage may correspond to a network page request volume, memory usage, processor usage, and/or other metrics relating to usage of resources by the network page servers 166 (FIG. 1) that are configured to serve up the dynamic network site. In various embodiments, the resource usage may be given as a percentage of resources currently allocated to the dynamic network site. The resource usage may be averaged and/or processed to reflect a predefined period of time in various embodiments.

In box 506, the dynamic site management application 133 determines whether the resource usage meets or exceeds a maximum threshold. In other words, the dynamic site management application 133 determines whether the resource usage is greater than a maximum resource usage associated with the current allocation of resources. Such a maximum resource usage may be determined manually or automatically based, for example, on desired quality of service, response time, and/or other factors.

If the resource usage meets or exceeds the maximum threshold, the dynamic site management application 133 moves to box 509 and allocates additional resources on the computing device 106 (FIG. 1) to serve up the dynamic network site. The amount of scaling up may depend on the relative undercapacity reflected by the resource usage. In one embodiment, the dynamic site management application 133 may reserve and instantiate additional virtual machine instances in the computing device 106. Thereafter, the portion of the dynamic site management application 133 ends.

Otherwise, the dynamic site management application 133 continues to box 512 and determines whether the resource usage exceeds a minimum threshold. If so, the current allocation of resources is both adequate and not excessive, and no scaling of the current allocation of resources is performed. Thereafter, the portion of the dynamic site management application 133 ends.

Otherwise, the resource usage meets or falls beneath a minimum threshold. Thus, an excessive amount of resources are currently allocated given the resource usage. The dynamic site management application 133 continues to box 515 and deallocates resources to serve up the dynamic network site. In scaling down the resources, the dynamic site management application 133 may stop one or more of the virtual machine instances in the computing device 106 that are allocated to the dynamic network site. The amount of scaling down may depend on the relative overcapacity indicated by the resource usage.

In box 518, the dynamic site management application 133 determines whether the dynamic network site is to be decommissioned. As a non-limiting example, the topic of the dynamic network site may be passé and the dynamic network site may be receiving few if any visits. If the dynamic network site is to be decommissioned, the dynamic site management application 133 moves to box 521 and further deallocates resources of the dynamic network site.

In various embodiments, the dynamic site management application 133 may configure a placeholder network page server 166 to serve up the network site. For example, the domain name of the dynamic network site may be added to a plurality of domain names that are virtual hosts on the placeholder network page server 166. In one embodiment, the virtual host determines a search query for the electronic commerce system 127 (FIG. 1) that is pre-populated in a network page 136 (FIG. 1) generated by the placeholder network page server 166. Thereafter, the portion of the dynamic site management application 133 ends. If the dynamic network site is not to be decommissioned, the dynamic site management application 133 also ends.

Figure 6:
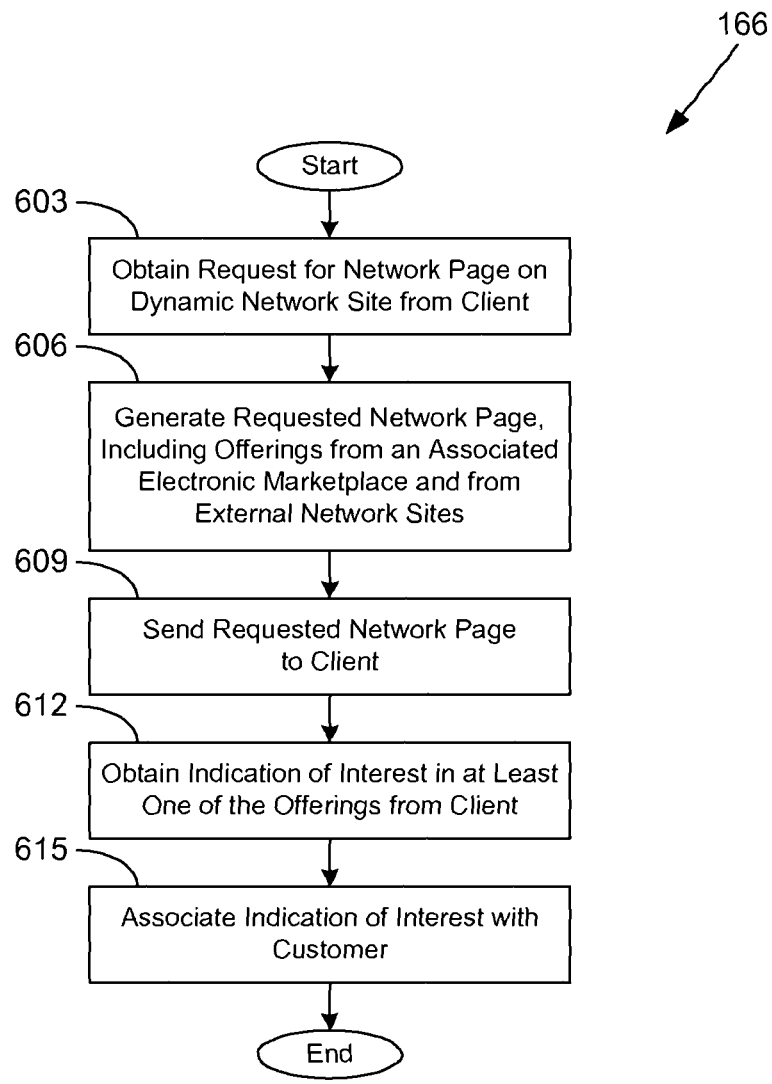
FIG. 6 is a flowchart illustrating one example of functionality implemented as portions of a network page server executed in a computing device in the networked environment of FIG. 1 according to various embodiments of the present disclosure.

With reference to FIG. 6, shown is a flowchart that provides one example of the operation of a portion of the network page server 166 according to various embodiments. It is understood that the flowchart of FIG. 6 provides merely an example of the many different types of functional arrangements that may be employed to implement the operation of the portion of the network page server 166 as described herein. As an alternative, the flowchart of FIG. 6 may be viewed as depicting an example method implemented in the computing device 106 (FIG. 1) according to one or more embodiments.

Beginning with box 603, the network page server 166 obtains a request for a network page 136 (FIG. 1) on a dynamic network site from a client 118 (FIG. 1). In box 606, the network page server 166 generates the requested network page 136. The generated network page 136 may include offerings of items 160 (FIG. 1) from an associated electronic marketplace, where the items 160 are selected from the catalog data 139. The generated network page 136 may also include offerings of items 160 from external network sites, where the items 160 are determined from the external catalog data 148 (FIG. 1). In box 609, the requested network page 136 is sent to the client 118 for rendering by the browser 184 (FIG. 1).

In box 612, the network page server 166 obtains an indication of an interest in at least one of the offerings from the client 118. For example, a customer at the client 118 may select a link or other user interface component in the network page 136 to order an item 160 or obtain more information about an item 160. Consequently, the browser 184 may be configured to send an indication of an interest in the corresponding item 160 to the network page server 166. In one embodiment, this is accomplished through redirection by the network page server 166. In one embodiment, it may be inferred that a customer has purchased an item 160 from an external electronic commerce system 172 when a customer selects a link to purchase the item 160 and does not subsequently return to the dynamic network site. In another embodiment, the external electronic commerce system 172 may communicate with the network page server 166, electronic commerce system 127 (FIG. 1), and/or other applications to indicate that the customer has purchased the item 160.

In box 615, the indication of interest in the item offering is associated with a profile of the customer in the customer data 142 (FIG. 1). In one embodiment, the customer may be identified through a cookie that may be correlated to an existing account in the electronic marketplace. Whether the customer has purchased, viewed, or indicated another type of interest in the item may be stored in feedback data 158 (FIG. 1). The feedback data 158 and/or the customer associations with the feedback data 158 may be used by the operator of the associated electronic marketplace to improve offerings of items 160 in the associated electronic marketplace. Additionally, the feedback data 158 and/or the customer associations may be published to third parties in some embodiments. Thereafter, the portion of the network page server 166 ends.

Figure 7:
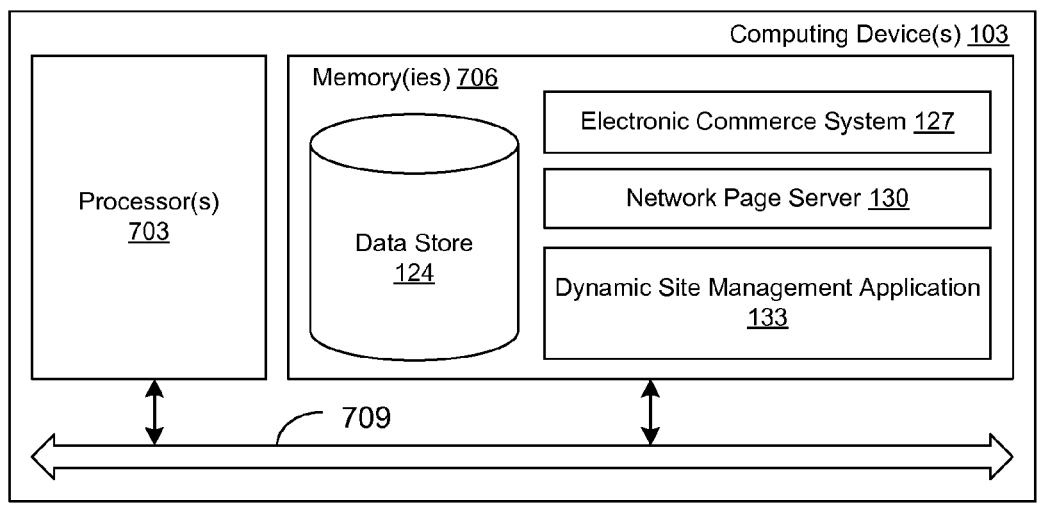
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the electronic commerce system 127, the network page server 130, the dynamic site management application 133, and potentially other applications. Also stored in the memory 706 may be a data store 124 and other data. In addition, an operating system may be stored in the memory 706 and executable by the processor 703.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network 121 (FIG. 1) that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the electronic commerce system 127, the network page server 130, the dynamic site management application 133, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-6 show the functionality and operation of an implementation of portions of the dynamic site management application 133 and the network page server 166. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 127, the network page server 130, the dynamic site management application 133, and the network page server 166, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in at least one computing device, wherein, when executed the program causes the at least one computing device to at least:
identify a set of items in an electronic catalog corresponding to a search term;
establish a corresponding network site for the search term in response to determining that the set of items includes at least a predefined number of items, the corresponding network site offering at least some of the set of items for sale, the corresponding network site including content that is search engine optimized for the search term;
automatically scale a quantity of machine instances allocated to hosting the corresponding network site based at least in part on a measure of resource usage associated with the corresponding network site;
generate a first network page of the corresponding network site in response to a request, the first network page offering a plurality of the set of items for order and including a plurality of external item offerings that are relevant to the search term and are associated with a plurality of external network sites, wherein the plurality of the set of items and the plurality of external item offerings are featured with a same prominence in the first network page, the first network page including the content that is search engine optimized for the search term and the first network page being generated according to a plurality of search engine optimization rules;
associate a profile of a user with an interest expressed by the user in one of the plurality of external item offerings, wherein the interest is expressed by the user when the user selects a link to a second network page of one of the plurality of external network sites, and the link is associated with the one of the plurality of external item offerings;
adjust a price associated with at least one of the set of items based at least in part on the interest expressed by the user in the one of the external item offerings; and
decommission the corresponding network site in response to determining that a measure of site traffic meets a decommissioning threshold.

2. A system, comprising:
at least one computing device; and
at least one application executed in the at least one computing device, wherein when executed the at least one application causes the at least one computing device to at least:
identify a set of items in an electronic catalog corresponding to a search term;
establish a corresponding network site for the search term in response to determining that the set of items includes at least a predefined number of items, the corresponding network site offering at least some of the set of items for consumption;
generate a network page of the corresponding network site in response to a request, the network page offering a plurality of the set of items for order and including a plurality of external item offerings that are relevant to the search term and are associated with a plurality of external network sites, the network page including content that is search engine optimized for the search term and the network page being generated according to a plurality of search engine optimization rules;
determine that a measure of site traffic for the corresponding network site meets a decommissioning threshold; and
decommission the corresponding network site.

3. The system of claim 2, wherein the at least one application further causes the at least computing device to at least establish a plurality of corresponding network sites for a plurality of search terms, each corresponding network site of the plurality of corresponding network sites corresponding to a respective search term of the plurality of search terms.

4. The system of claim 2, wherein the at least one application further causes the at least computing device to at least:
automatically generate a domain name for the corresponding network site; and
wherein establishing the corresponding network site further causes the at least one computing device to establish the corresponding network site at the domain name.

5. The system of claim 2, wherein the at least one application further causes the at least computing device to at least:
attempt to register an automatically generated domain name with a domain registrar;
in response to the automatically generated domain name being unavailable from the domain registrar, obtain an alternative domain name from a client and attempt to register the alternative domain name with the domain registrar; and
wherein establishing the corresponding network site further causes the at least one computing device to establish the corresponding network site at the automatically generated domain name or the alternative domain name in response to the automatically generated domain name or the alternative domain name being registered with the domain registrar.

6. The system of claim 2, wherein the at least one application further causes the at least one computing device to least:
monitor a resource usage associated with hosting the corresponding network site;
determine that the resource usage meets a threshold; and
automatically adjust a quantity of machine instances assigned to hosting the corresponding network site.

7. The system of claim 2, wherein the at least one application further causes the at least one computing device to least identify the search term from a plurality of search terms associated with a search engine.

8. The system of claim 2, wherein generating the network page that includes the content that is search engine optimized for the search term further comprises inserting the search term into the content rendered for display on the network page.

9. A method, comprising:
   determining, by at least one computing device, a frequent search term for a search engine;
   identifying, by the at least one computing device, a set of items in an electronic catalog that are relevant to the search term;
   determining, by the at least one computing device, that the set of items includes at least a predefined number of items;
   establishing, by the at least one computing device, a corresponding network site that offers at least some of the set of items for sale;
   generating, by the at least one computing device, a network page of the corresponding network site in response to a request, the network page offering a plurality of the set of items for order and including a plurality of external item offerings that are relevant to the search term and are associated with a plurality of external network sites, the network page including content that is search engine optimized for the search term and the network page being generated according to a plurality of search engine optimization rules;
   determining, by the at least one computing device, that a measure of site traffic for the corresponding network site meets a decommissioning threshold; and
   decommissioning, by the at least one computing device, the corresponding network site.

10. The method of claim 9, wherein establishing the corresponding network site further comprises allocating, by the at least one computing device, an initial quantity of machine instances in an elastic computing resource to the corresponding network site.

11. The method of claim 9, wherein establishing the corresponding network site further comprises adding, by the at least one computing device, a virtual host to an existing network page server that is configured to host at least one other network site.

12. The method of claim 9, further comprising:
   monitoring, by the at least one computing device, a resource usage associated with hosting the corresponding network site;
   determining, by the at least one computing device, that the resource usage meets a threshold; and
   automatically adjusting, by the at least one computing device, a quantity of machine instances assigned to hosting the corresponding network site.

13. The method of claim 9, further comprising automatically generating, by the at least one computing device, a domain name for the corresponding network site.

14. The method of claim 9, further comprising attempting to register, by the at least one computing device, an automatically generated domain name for the corresponding network site with a domain registrar.

15. The method of claim 9, further comprising:
   determining, by the at least one computing device, that an automatically generated domain name for the corresponding network site is unavailable to be registered;
   receiving, by the at least one computing device, a user-specified alternative domain name for the corresponding network site; and
   attempting to register, by the at least one computing device, the user-specified alternative domain name with a domain registrar.

16. The method of claim 9, further comprising:
   generating, by the at least one computing device, an external item catalog associated with at least one external merchant by querying at least one external network site; and
   including, by the at least one computing device, a plurality of external item offerings from the external item catalog on the corresponding network site, the plurality of item offerings being relevant to the search term.

17. The method of claim 16, further comprising:
   determining, by the at least one computing device, that a user has expressed an interest in at least one of the plurality of external item offerings; and
   associating, in the at least one computing device, a profile of the user with the interest in the at least one of the plurality of external item offerings.

18. The method of claim 17, wherein the interest expressed by the user corresponds to a purchase of the at least one of the plurality of external item offerings.

19. The method of claim 17, further comprising adjusting, by the at least one computing device, a price associated with at least one of the set of items based at least in part on the interest expressed by the user in the at least one of the plurality of external item offerings.

20. The method of claim 9, wherein generating the network page according to the plurality of search engine optimization rules further comprises inserting the search term in a meta tag associated with the network page.

* * * * *